April 18, 1939.　　　R. R. SANDERSON　　　2,154,960
PERCUSSION DRILL
Filed Jan. 9, 1936
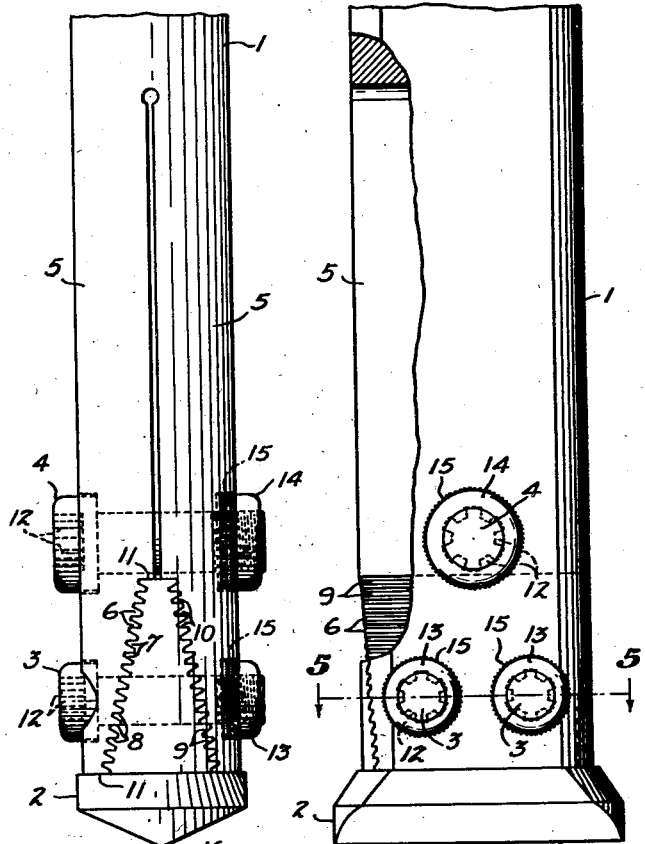
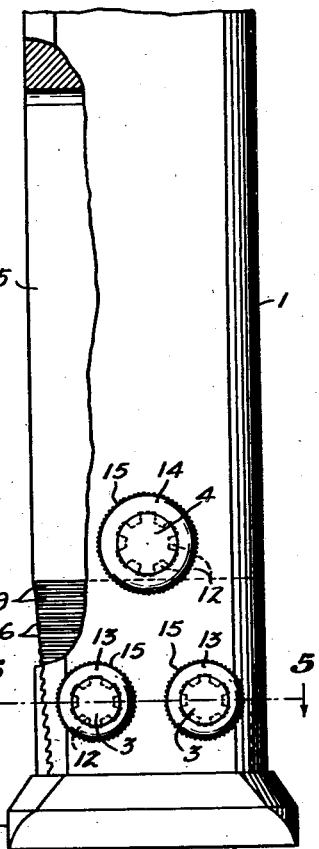
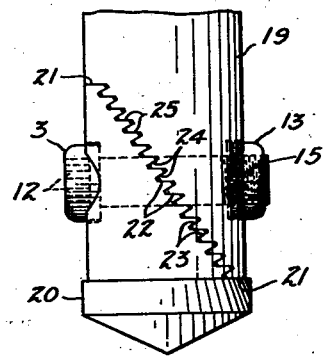
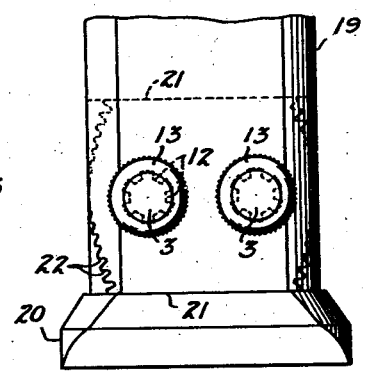
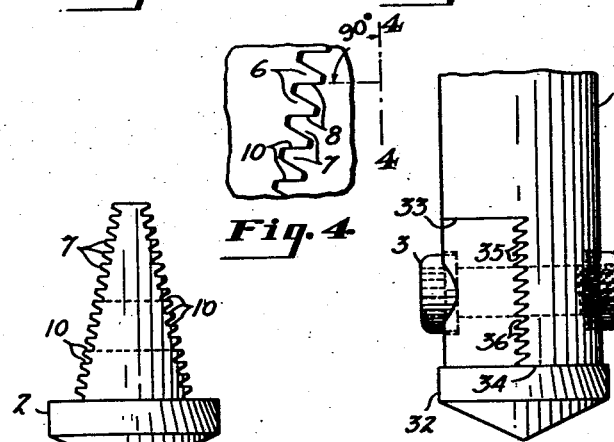
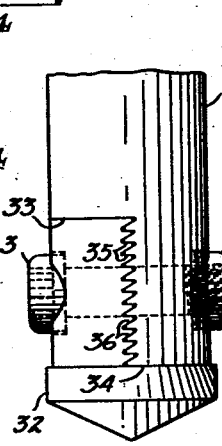
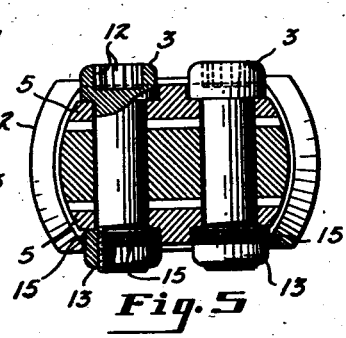
INVENTOR
Ray R. Sanderson
BY Evans & McCoy
ATTORNEYS Patented Apr. 18, 1939

2,154,960

UNITED STATES PATENT OFFICE 2,154,960

PERCUSSION DRILL

Ray R. Sanderson, Orrville, Ohio

Application January 9, 1936, Serial No. 58,356

8 Claims. (Cl. 255—63)

This invention relates to tools used in deep well drilling and more particularly to a drill bit blade and bit tip assembly for use in churn and percussion drilling.

An object of the present invention is to provide an improved drill bit blade and bit tip assembly that is characterized by a prolonged service life with minimized probability of separation or fracture in service.

Another object is to provide a drill bit blade and bit tip assembly wherein an enlarged area of contacting impact surface is provided therebetween.

Another object is to provide a drill bit blade and bit tip assembly that is quickly and simply assembled and disassembled and wherein a plurality of replaceable bit tips may be removably secured to a bit blade.

With the above and other objects in view, which will be apparent from the following detailed description, the present invention may be said to consist in certain features of construction and combinations of parts which will be understood readily by those skilled in the art to which the invention appertains.

In the accompanying drawing, which illustrates suitable embodiments of the invention, Figure 1 is an edge elevation of one form of drill bit blade and bit tip assembly;

Fig. 2 is a side elevation, partly broken away, of the drill bit blade and bit tip assembly that is shown in Fig. 1;

Fig. 3 is an edge elevation of the drill bit tip that forms a part of the assembly that is shown in Fig. 1;

Fig. 4 is an enlarged detail view in perspective of the mating surfaces that form a part of the bit tip that is shown in Fig. 3;

Fig. 5 is a transverse section, partly broken away, taken along the line 5—5 of Fig. 2;

Fig. 6 is an edge elevation of a modified form of drill bit blade and bit tip assembly;

Fig. 7 is a side elevation of the drill bit blade and bit tip assembly that is shown in Fig. 6; and Fig. 8 is an edge elevation of a second modification in drill bit blade and bit tip assembly.

In the drill bit blade and bit tip assembly that is shown in Figs. 1 to 5 inclusive of the accompanying drawing, the drill bit blade 1 and the bit tip 2 are held in releasably secured relation with each other by a plurality of bit tip securing bolts 3 and a bit blade leg portion restraining bolt 4 that extend transversely of the drill bit blade 1.

The bit tip engaging end of the drill bit blade 1 is preferably slit longitudinally along a portion of its length to provide bifurcated leg portions 5 that may be sprung apart slightly to facilitate the insertion or withdrawal of the bit tip 2.

A plurality of inwardly extending lands 6 are formed on the inside surface of the bit blade and mate with similarly shaped lands 7 formed on the bit tip. The lands 6 of the bit blade consist of a plurality of bit blade impact faces 8 that are disposed substantially normal to the longitudinal axis of the drill bit blade, and that alternate with a plurality of inclined faces 9 that are disposed in angular relation with the longitudinal axis of the drill bit blade and that serve to wedge the impact faces 8 of the bit blade into tight engagement with the corresponding impact faces 10 of the bit tip. The pair of bit blade impact faces 11, that are substantially normal to the longitudinal axis of the drill bit blade 1, form upper impact faces and the lower extremity of the drill bit blade leg portions.

The lands 6 of the bit blade and the lands 7 of the bit tip are preferably formed by machining these surfaces approximately to size and then broaching with a suitable broaching tool to insure uniformity of size and location of the mating impact surfaces and of the wedging surfaces, and accuracy of fit between the blade and the tip impact surfaces.

The enlarged section, Fig. 4, shows in more detail the approximate angularity of the mating and wedging surfaces with respect to the axis of the bit blade, the line 4—4 being drawn parallel with the blade axis. The important element of these mating surfaces is to provide impact transmitting surfaces that are substantially normal to the direction of impact and of considerably enlarged area as compared with the sectional area of the mating parts and also to provide wedging faces that maintain the impact faces in rigid engagement.

The downwardly depending legs of the drill bit blade are apertured transversely for the reception of the bit tip securing through bolts 3 and the somewhat larger bit blade leg restraining through bolt 4.

The bolt-receiving apertures of the bit blade have enlarged bolt head and bolt nut receiving sockets that serve to partly countersink the head and nut of each bolt in the side walls of the legs of the drill bit blade.

Each bolt head has a wrench aperture formed by a plurality of inwardly projecting splines 12 for engagement with a conventional wrench (not shown) for tightening the threaded portion of the bolts into nuts 13 and 14.

Each nut 13 and 14 has a toothed or serrated circumferential band 15, preferably of somewhat larger dimension than the nut-receiving socket to rigidly hold each nut in place in its socket and prevent rotation of the nuts when the bolts are tightened, but permitting a worn nut to be driven out and replaced by a new nut in service, as wear occurs.

The bit tip has a cutting face 16 of conventional form.

The bit tip is assembled with the bit blade by spreading the legs 5 of the blade sufficiently to permit sliding the bit tip into place in the direction of the lands 6 and 7. When the lateral edge faces of the blade register with the faces of the tip, the through bolts 3 are inserted in place and are drawn up to tighten the blade in place. The blade bolt 4 is then tightened up and this rigidly secures these parts together. The bit tip is then struck a sharp blow with a hammer, and if the blade and tip ring as one piece the bit is ready for use, as well known by those skilled in the art.

The modified form of drill bit blade and bit tip assembly, that is shown in Figs. 6 and 7 of the drawing, comprises a drill bit blade 19 to which a drill bit tip 20 is secured by a plurality of bolts 3 that extend transversely thereof in a direction that is substantially normal to the longitudinal axis of the bit blade and bit tip assembly. In this form of the invention the blade is not bifurcated and the single set of mating surfaces reduces the cost of manufacture.

The drill bit blade preferably has an upper and lower impact face 21 and a series of intermediate impact faces 22, all of which are substantially normal to the longitudinal axis of the bit blade. The bit blade impact faces alternate with a plurality of inclined wedging faces 23 that engage corresponding wedging faces 24 of the bit tip to force the impact faces 21 and 22 into rigid engagement with the corresponding impact faces 24 and 25 of the bit tip.

As in the previously described construction, the bit tip is secured in rigid engagement with the bit blade by through bolts 3 of the same construction as the bolts of the same reference numeral previously described. The nut in this case is anchored in the bit blade in the same manner as previously described. The assembly of the parts will be apparent to those skilled in the art, and correctness of the assembly is tested in the same way.

A further modification of the bit blade and bit tip assembly is shown in Fig. 8 of the accompanying drawing, wherein the bit blade 31 is secured to the bit tip 32 by the through bolts 3 of the character heretofore described.

In this construction the bit blade 31 is shouldered downwardly to provide the bit blade with an upper impact face 33 and lower impact face 34, both of which are disposed substantially normal to the longitudinal axis of the drill bit blade 31. The intermediate impact faces 35 of the blade are also normal to the longitudinal axis of the blade. The bit tip has corresponding impact faces that register with the impact faces of the bit blade and are correspondingly located. The wedging faces 36 of the bit blade engage correspondingly inclined and positioned faces of the bit tip to force the impact faces into registered relation.

In each of the described constructions the impact forces that are transmitted between the bit blade and the bit tip are transmitted through impact faces that are disposed substantially normal to the longitudinal axis of the bit blade and bit tip assembly and are so formed as to provide a greatly increased impact surface area, due to the overhang or overlapping of the impact faces on each member of the drill bit.

The increased impact total surface area decreases the impact force, per unit of area, that is transmitted between the bit blade and the bit tip in service, thereby decreasing the probability of distortion of the metal forming these contacting impact surfaces for metal of any given quality.

The drill bit blade and bit tip assembly and disassembly are accomplished simply and easily with a minimum of effort and time, and the wearable parts are readily replaced.

It is to be understood that the particular constructions of the members that make up the described drill bit blade and bit tip assembly that are shown and described herein are presented for purposes of illustration and explanation, and that various modifications in their constructions and adaptations may be made without departing from the invention as defined in the appended claims.

What I claim is:

1. A drill bit assembly, comprising a drill bit blade having top and bottom impact faces normal to the axis of said blade, a plurality of overlapping impact faces disposed between said top and bottom impact faces and forming a part of said bit blade, a plurality of bit blade inclined slip faces alternated with said impact faces and of substantially equal areas and of a uniform inclination on either side of the axis of said bit blade, a single piece bit tip having top and bottom impact faces for registry with said top and bottom impact faces of said bit blade, a plurality of bit tip inclined slip faces alternated with said bit tip impact faces and of substantially uniform inclination and equal areas on either side of the axis of said bit tip, and means for securing said bit tip to said bit blade.

2. A drill bit assembly, comprising a drill bit blade having top and bottom impact faces normal to the axis of said blade, a plurality of overlapping impact faces disposed between said top and bottom impact faces and forming a part of said bit blade, a plurality of overlapping bit blade inclined slip faces alternated with said bit blade impact faces and of substantially a uniform inclination and equal area on either side of the axis of said bit blade, a single piece bit tip having top and bottom impact faces for registry with said top and bottom impact faces of said bit blade, said bit tip also having a plurality of overlapping impact faces forming a part of said bit tip and interposed between said top and bottom impact faces and adapted for substantially engaging said bit blade overlapping impact faces, a plurality of bit tip inclined slip faces alternated with said bit tip impact faces and of substantially a uniform inclination and equal area on either side of the axis of said bit tip, and means for securing said bit tip to said bit blade, all of said impact faces being substantially normal to the longitudinal axis of said bit blade.

3. A drill bit assembly, comprising a drill bit blade having upper and lower impact faces and having a plurality of overlapping impact faces forming a part of said bit blade and positioned normal to the axis thereof and disposed between said upper and lower impact faces, a plurality of overlapping inclined slip faces alternating with said overlapping impact faces and of substantially equal areas and inclination to the axis on either side of said bit blade axis, a single piece bit tip having upper and lower impact faces and having a plurality of overlapping impact faces normal to the axis of the bit tip and arranged to engage corresponding overlapping impact faces formed on said bit blade and having a plurality of overlapping inclined slip faces that are arranged to engage the slip faces of said bit blade, and transverse means binding said bit tip to said bit blade.

4. A drill bit assembly, comprising a drill bit blade having a bifurcated leg portion with opposed outwardly diverging inner faces, each of said leg portions comprising upper and lower impact faces and a plurality of overlying flat impact faces disposed therebetween and that are substantially normal to the longitudinal axis of the bit blade and that are alternated with a plurality of overlying inclined slip faces that are substantially of a common inclination and area on either side of the axis of said bit blade, a single piece bit tip having upper and lower impact faces registering with said upper and lower impact faces of said bit blade and having a pair of converging bit blade engaging faces disposed substantially normal to the longitudinal axis of the bit tip and alternated with overlying inclined slip faces that are substantially of a common inclination and area on either side of the axis of said bit tip, the respective overlying impact and slip faces of the bit blade and bit tip members being so disposed and proportioned as to register with each other, and means for securing the respective bit blade and bit tip faces together.

5. A drill bit assembly, comprising a drill bit blade having a top and a bottom impact face normal to the axis of said blade and spaced from each other longitudinally of said blade, a plurality of overlapping impact faces disposed between said top and bottom impact faces and forming a part of said bit blade, a single piece bit tip having a top and a bottom impact face for registry with said top and bottom impact faces of said bit blade and of substantially equal areas on either side of the axis of said bit tip, said bit tip also having a plurality of overlapping impact faces disposed between the top and bottom impact faces of said bit tip and engaging said overlapping bit blade impact faces and substantially of a uniform inclination and equal area on either side of the axis of said bit tip, a bolt disposed transversely of said bit blade and positioned between said bit blade top and bottom impact faces and passing through said bit tip for securing said bit tip in place and having a head portion remote from a threaded end, wrench-engaging means forming a part of said bolt head, a nut removably positioned on the threaded end of said bolt, a serrated surface disposed along the periphery of said nut, and a serrated surface forming the inner periphery of a nut-receiving aperture in said bit blade for engaging said nut serrated surface in nonrotative interengagement.

6. In combination, a bit blade split axially along a portion of its length to impart resilience thereto, a pair of downwardly and outwardly inclined faces opening upwardly into said axial split and having alternate wedging ribs and grooves thereon, a single piece bit tip having an upwardly converging portion having faces having alternate wedging ribs and grooves thereon and for engaging said downwardly and outwardly inclined faces of said bit blade in force receiving and transmitting relation in substantially equal and balanced magnitude on either side of the longitudinal axis of said combined bit blade and bit tip, and means binding said bit blade and bit tip contacting faces together.

7. A bit blade and bit tip assembly, comprising in combination a bit blade having a pair of downwardly diverging faces, a plurality of alternated wedge ribs and grooves disposed in said blade faces, a single piece bit tip having a pair of upwardly substantially converging faces, a plurality of alternated wedge ribs and grooves disposed in said tip faces, clamping means for maintaining said bit blade diverging and bit tip converging faces in engagement with each other, said bit blade diverging and bit tip converging faces transmitting forces directed axially of the assembly substantially in equal magnitude on either side of the longitudinal axis of said assembled bit blade and bit tip and substantially toward said axis.

8. In combination, a bit blade split axially along a portion of its length to impart resilience thereto, a pair of downwardly and outwardly inclined blade faces opening upwardly into said axial split, a plurality of alternated wedging ribs and grooves disposed in said blade faces, a single piece bit tip having an upwardly converging portion disposed substantially midway of the lateral edges thereof and having faces engaging said downwardly and outwardly inclined faces of said bit blade in force-transmitting relation in substantially equal and balanced magnitude on the opposite sides of the axis of said combined bit blade and bit tip, a plurality of alternated wedging ribs and grooves disposed in said tip converging portion faces, means transversely binding the split portions of said bit blade against a part of said bit tip, and means restricting the lateral resilience of said split portions of said bit blade adjacent said bit tip converging portion.

RAY R. SANDERSON.